O. REYNOLDS.
Bee Hive.
No. 5,211.
Patented July 31, 1847.
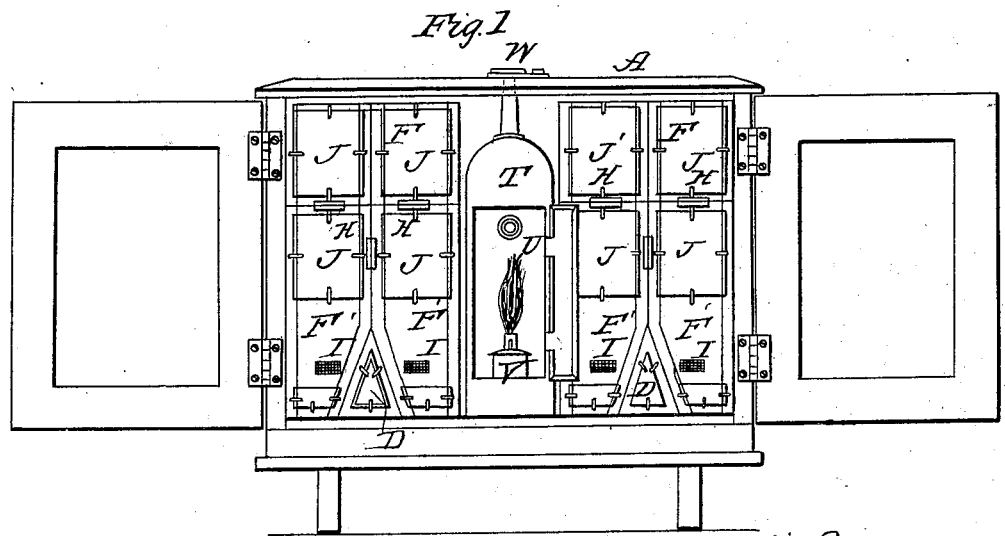
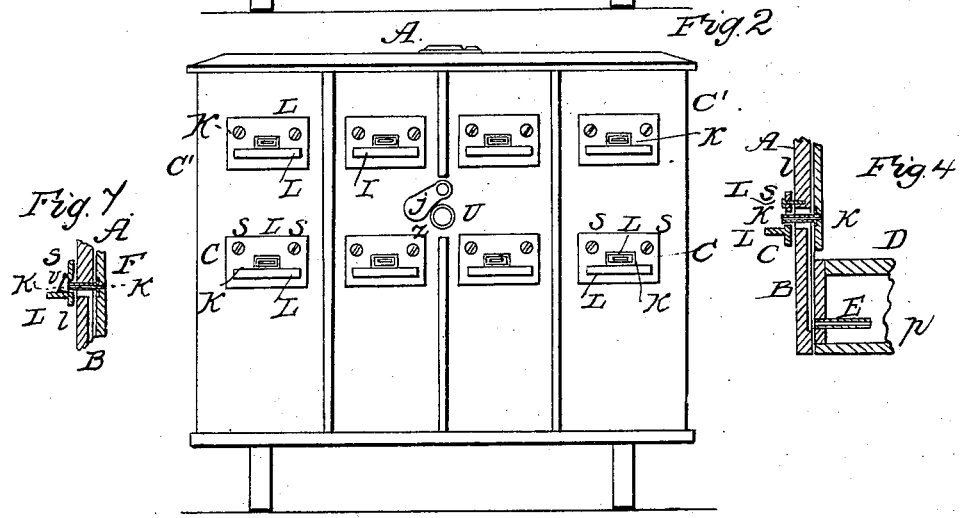
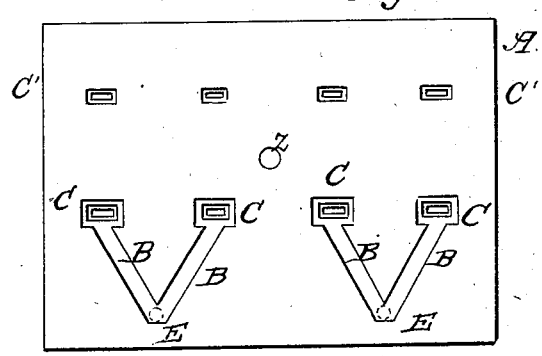
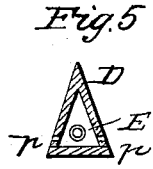

UNITED STATES PATENT OFFICE.

OLIVER REYNOLDS, OF WEBSTER, NEW YORK.

BEEHIVE.

Specification of Letters Patent No. 5,211, dated July 31, 1847.

*To all whom it may concern:*

Be it known that I, OLIVER REYNOLDS, of Webster, in the county of Monroe and State of New York, have invented a new and useful Improvement in the Manner of Constructing Beehives, called the "New York Apiary," which is described as follows, reference being had to the annexed drawings of the same, making part of this specification.

Figure 1 is an elevation of the back of the hive—the doors of the case being open in order to show the hives and moth traps. Fig. 2 is an elevation of the front of the hive, showing the lighting boards L upon which the bees light on entering the hive. Fig. 3 is an elevation of the channeled side of the case showing the inclined channels or grooves B in the same leading to the triangular traps D Figs. 1, 4, 5. Fig. 4 is a vertical section of ditto and one of the lighing boards L entrance tubes K and one of the triangular traps D. Fig. 5 is a vertical cross section of one of the triangular traps D. Fig. 7 is a side view of a lighting board made with a gage valve *v* used in separating the drones from the working bees.

Similar letters in the several figures refer to corresponding parts.

The nature of my invention and improvement consists in combining with the hive an illuminated chamber T for alluring the bee-moths into it where they are destroyed. Also in constructing the lower hives each with one side inclined inward forming triangular spaces between every pair of hives for the insertion of triangular moth traps D. Likewise in constructing the outer case with inclined channels B leading from the entrance to the triangular moth traps. Also in forming spaces behind and between the vertical parts of the lighting boards L communicating with the inclined channels B to admit the bee moth to enter said channels. Likewise in forming spaces around the tubes at which the bees enter to admit the moths to the inclined channels B leading to the traps D.

The external case A is made in the usual, or most approved manner, (except in its being constructed with certain channels) being of a rectangular form and of suitable size and material for containing the bee hives and moth traps hereafter described. The inclined ways or channels B leading from the entrances C in front to the triangular traps D, are made in the front of the hive on the inner side thereof, next the hives and consist of as many ways, or channels, as there are entrances in the case and united at their lower ends where they meet the horizontal tubes E Fig. 4 in the triangular traps D forming a figure resembling the letter V inverted.

The upper boxes or hives F are made and arranged in the usual manner, except. The lower range F' are made in the following manner. One side of each box next the space for the reception of the triangular trap, and half its height, is made to incline inward toward the center of the box at an angle of about 60 or 80 degrees with the bottom so that when two of these boxes, thus made, are brought together they form a triangular space between them for the reception of the triangular box or trap D whose sides are made to incline at the same angle as the sides of the hive and to fit said space. The boxes or hives in other respects are made in the usual manner— H being the slides, I the ventilators and J the windows.

The tubes K through which the bees enter the boxes are made of a rectangular form, or other shape, and of suitable length, having flanges by which they are fastened to the outer surface of the boxes over the entrances to the same. The openings C in the front of the case A through which these tubes protrude are made a little larger than the tubes in order to form spaces around them through which the moth may enter the case in his endeavors to reach the mouth of the tube instead of the hive or boxes. Said spaces communicating with the aforesaid inclined ways B leading to the triangular traps D as before stated. The moth in trying to enter the hive will meet the spaces C as he travels toward the mouth of the tubes K and will be conducted by them to the inclined ways B and thence to the horizontal tubes E in the triangular traps D.

The triangular traps D have each a horizontal tube E inserted into its front end, near the bottom, and extending inward about half its length, so that when the moths have passed through these tubes and descended to the floor they are unable afterward to find the tubes to gain an exit on account of their being elevated above the floor of the traps.

The lighting boards L for the bees to light upon in entering the hives are made in the shape of the figure L—the vertical portions being screwed to the case over the openings C into which the entrance tubes K are inserted, and at a distance therefrom a little less than the size of the bees forming a space, or entrance, behind the vertical portion of the lighting board, for the moths to enter at and communicating with the spaces C in the case in which the tubes K are placed and with the inclined ways B leading to the tubes E in the triangular traps D. The moths in passing up the sides of the case will meet the small spaces behind the lighting boards L and will enter them thus avoiding the upper side of the lighting boards where the entrance tubes K of the hives are arranged.

The illuminated moth trap T consists of an apparatus resembling a dark lantern externally. It has an opening in front near the top into which is inserted a horizontal funnel shaped gage tube U leading to the interior of the moth trap and open at both ends, there being an opening Z in the external case A opposite said gage tube at which the moths enter the said tube, covered by a button $j$ for preventing the entrance of the bees during the day. A lamp V to illuminate the trap and allure the moths into it through the aforesaid tapered gage tube U is placed upon, or near, the bottom of the trap. An aperture is made in the top of the trap into which a tube W is inserted which answers for a chimney for canveying the smoke.

The back of the trap is provided with a suitable door X by which to gain access to the interior thereof.

The lamp V being lighted in the evening the moths will be allured into the trap through the horizontal gage tube U and flit about the light, or descend to the floor, where they will be destroyed by a small quantity of water placed in the bottom of the trap.

In order to separate the drones from the bees I have a gage or reticulated valve or shutter $v$ placed, hinged or hooked against the face of the vertical part of the lighting board L Fig. 7 opening outward, so that when the bees and drones, at the end of the summer, (when required to be separated), pass out of the hive, they push said valve outward and pass under the lower edge thereof, which then swings back to its former position. The bees and drones in returning to the hive find the usual entrances thus closed against then. They then find the space $l$ back of the lighting board which has been previously enlarged by unscrewing the screws $s$ at which they enter; and this space communicating with the space $c$ around the tube $k$, which is made sufficiently large to admit the bee and drone to pass into the inclined channels B, which lead to a larger tube inserted into the trap D in place of the tube E by which the bee and drone are thus entrapped. The bee passes thence through a small opening $p$ Figs. 4 and 5 in the side of the triangular trap into the hive F, through another small opening in the side thereof which is coincident with said small opening $p$ in the trap—the drone being left in the trap, he being too large to pass through said openings. These openings are to be closed during the operation of taking the moths.

The mode of managing the bees being the same as that described in my former patent renders it unnecessary to describe it in this patent. With this exception that the bee robber is taken by closing the entrance to the hive and allowing him to enter the case by the opening $l$ behind the lighting board L and pass thence by the inclined ways B to the triangular trap D where he is taken in the manner that the drone is taken.

I do not claim as my invention the external case A, nor the lighting boards L, nor the lifting board M nor the upper boxes or hives F, nor the use of a lantern, but What I do claim as my invention and which I desire to secure by Letters Patent is—

1. Making the case A with the spaces C around the entrance tubes K combined with the inclined ways B leading to the triangular traps D in the manner and for the purpose set forth.

2. I claim forming the entrances $l$ behind the lighting boards L in the manner and for the purpose set forth,—that is to say by suspending the lighting boards to the front of the case A by the screws, $s$, which are turned to the right or to the left for increasing or diminishing said spaces.

3. I claim narrowing each hive F on one side thereof where it unites with the adjoining hive so as to form triangular spaces for the reception of the triangular traps D as above described.

4. I claim forming the moth traps D with a horizontal tube E communicating with the interior of the trap and with the inclined channels B in the case, arranged and operating in the manner set forth, by which the moths are conducted into the traps and prevented from escaping therefrom.

5. I claim the method of separating the drones from the working bees as above described.

OLIVER REYNOLDS.

Witnesses:
  WM. P. ELLIOTT,
  ALBERT E. H. JOHNSON.